US007565435B2

(12) United States Patent  
Rouyer et al.

(10) Patent No.: US 7,565,435 B2
(45) Date of Patent: Jul. 21, 2009

(54) METHOD FOR OBTAINING THE BEST CONNECTIVITY ACHIEVABLE WITHIN VIRTUAL LOCAL AREA NETWORKS

(75) Inventors: Jessy V. Rouyer, Fort Worth, TX (US); Guillaume Ivaldi, Saulx les Chartreux (FR); Laurence Rose, Oak Park, CA (US)

(73) Assignee: Alcatel Lucent, Paris (FR)

( * ) Notice: Subject to any disclaimer, the term of this patent is extended or adjusted under 35 U.S.C. 154(b) by 1022 days.

(21) Appl. No.: 10/741,687

(22) Filed: Dec. 20, 2003

(65) Prior Publication Data

US 2005/0149625 A1 Jul. 7, 2005

(51) Int. Cl.
*G06F 15/16* (2006.01)
*G06F 15/173* (2006.01)
*G06F 15/177* (2006.01)

(52) U.S. Cl. .................. 709/227; 370/256; 370/230; 709/232

(58) Field of Classification Search ......... 709/217–232; 370/256, 230
See application file for complete search history.

(56) References Cited

U.S. PATENT DOCUMENTS

| 5,394,402 | A | 2/1995 | Ross ..................... 370/94.1 |
| 6,515,969 | B1 | 2/2003 | Smith ..................... 370/256 |
| 7,061,876 | B2* | 6/2006 | Ambe ..................... 370/256 |
| 7,292,581 | B2* | 11/2007 | Finn ..................... 370/395.53 |
| 2002/0147800 | A1 | 10/2002 | Gai et al. | |
| 2003/0169694 | A1* | 9/2003 | Seaman ..................... 370/254 |
| 2004/0264374 | A1* | 12/2004 | Yu et al. ..................... 370/230 |
| 2005/0013260 | A1* | 1/2005 | Ramanathan et al. ....... 370/256 |
| 2005/0050220 | A1* | 3/2005 | Rouyer et al. ............... 709/232 |

FOREIGN PATENT DOCUMENTS

EP 0 851 634 A2 1/1998

OTHER PUBLICATIONS

IEEE Standard for Local and Metropolitan Area Networks "Virtual Bridged Local Area Networks" (IEEE std. 802.1Q 2003 Edition); pp. I-312; May 2003.
IEEE Standard for Local and Metropolitan Area Networks "Virtual Bridged Local Area Networks—Amendment 3: Multiple Spanning Trees" (IEEE std. 802.1s) pp. 1-211, Dec. 31, 2002.
ANSI/IEEE Std. 802.1D, 1998 Edition "Information Technology-Telecommunications and Information Exchange Between Systems-Local and Metropolitan Area Networks-Common Specification-Part 3: Media Acccess Control (MAC) Bridges" pp. 1-375, 1998.

(Continued)

*Primary Examiner*—Haresh N Patel

(57) ABSTRACT

A method is described herein for configuring a computer network managed by the IEEE Std 802.1s™-2002 MSTP standard or any other equivalent standard such as IEEE Std 802.1Q™-2003 in a fully- or semi-automatic manner such that: (1) if at all possible and in the case of a failure in the MSTP-based computer network affecting a Multiple Spanning Tree Instance (MSTI), MSTP reestablishes connectivity in that MSTI by preferably activating links whose activation ensures that the connectivity within a Virtual Local Area Network (VLAN) mapped onto and associated with that MSTI is not lost; and (2) a VLAN is mapped onto a MSTI whose active topology covers the topology of this VLAN, this being ensured by setting up that MSTI depending on the desired VLAN topology.

18 Claims, 5 Drawing Sheets

OTHER PUBLICATIONS

IEEE Std. 802.1w-2001 "IEEE Standard for Local and Metropolitan Area Networks-Common Specification-Part 3: Media Acccess Control (MAC) Bridges-Amendment 2: Rapid Reconfiguration" pp. 1-116, 2001.

IEEE Std. 802.1Q "IEEE Standards for Local and Metropolitan Area Networks-Virtual Bridged Local Area Networks" pp. 1-327, May 7, 2003.

R. Perlman, "Interconnections Second Edition Bridges, Routers, Switches, and Internetworking Protocols" Addison-Wesley Publishing Company, Inc., pp. 59-79, 2000.

* cited by examiner

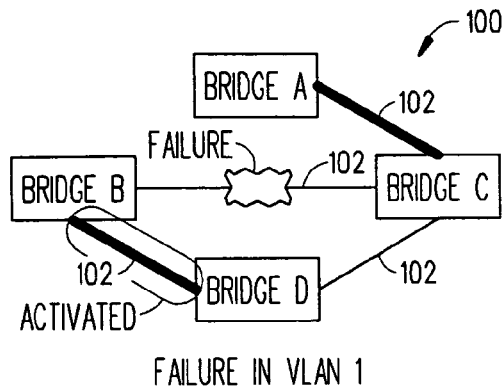
FAILURE IN VLAN 1
FIG. 6
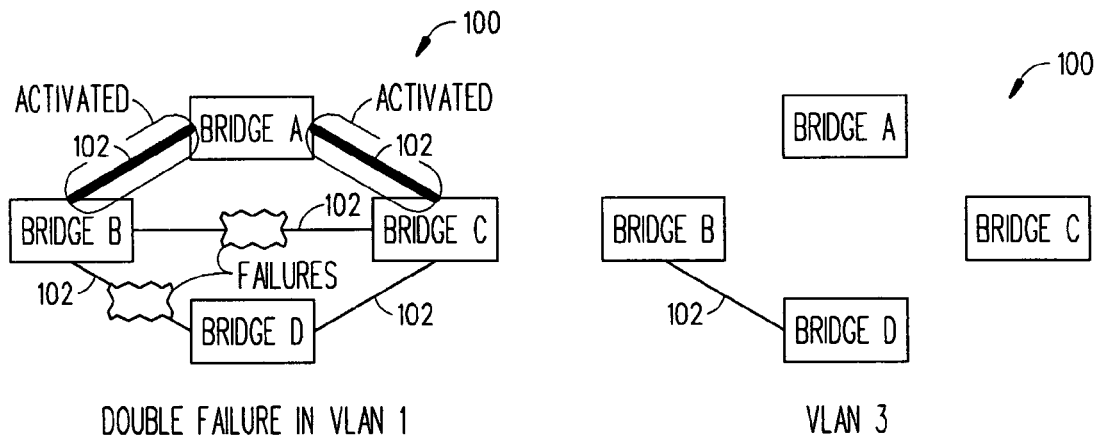
DOUBLE FAILURE IN VLAN 1
FIG. 7
VLAN 3
FIG. 8
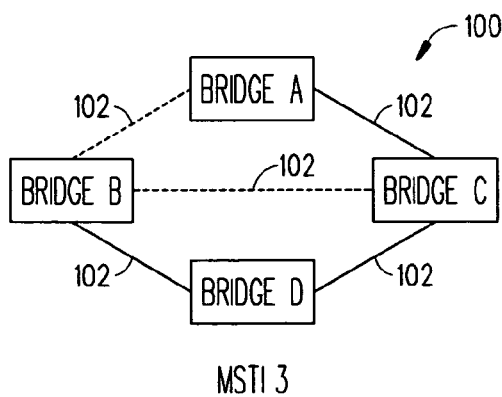
MSTI 3
FIG. 9
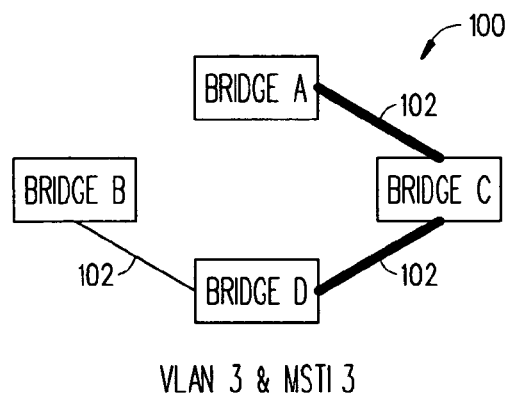
VLAN 3 & MSTI 3
FIG. 10

METHOD FOR OBTAINING THE BEST CONNECTIVITY ACHIEVABLE WITHIN VIRTUAL LOCAL AREA NETWORKS

BACKGROUND OF THE INVENTION

1. Field of the Invention

The present invention relates in general to computer networks and, in particular, to a method for obtaining the best connectivity achievable within Virtual Local Area Networks (VLANs) when these VLANs are mapped onto a computer network managed by the Multiple Spanning Tree Protocol (MSTP).

2. Description of Related Art

The present invention addresses devices at layer 2 of the Open Systems Interconnection (OSI) reference model that are controlled by the IEEE Std 802.1s™-2002 Multiple Spanning Tree Protocol (MSTP) or any other equivalent standard such as IEEE Std 802.1Q™-2003. These devices are often referred to as bridges. And, these bridges are usually grouped together to form a computer network that can be segregated into VLANs. For a detailed discussion about VLANs and how a computer network can be segregated into VLANs, reference is made to IEEE Std 802.1s™-2002 and IEEE Std 802.1Q™-2003 the contents of which are incorporated herein. Inside the computer network, the MSTP provides Multiple Spanning Tree Instances (MSTIs) to forward data frames that are assigned to any given VLAN between bridges. In case of a failure affecting a MSTI (e.g. one of the links forwarding data traffic in a MSTI fails), MSTP might reestablish connectivity in that MSTI by activating some links (i.e. having those links starting to forward data traffic). The activation of some of those links might not ensure that the connectivity within a VLAN mapped onto and associated with that MSTI is maintained. This would result in loss of connectivity within that VLAN, which is undesirable when other links could be activated whose activation would maintain the connectivity within that VLAN.

One way this problem is solved today is by a procedure described herein as "pruning MSTIs" It is believed that the "pruning" of MSTIs can be done by eliminating the MSTI Configuration Messages conveyed in a Multiple Spanning Tree Bridge Protocol Data Unit (MST BPDU) that is received by or transmitted from a bridge port. Such MST BPDUs are exchanged by MSTP-based bridges to construct and then maintain MSTIs. When a port stops receiving MSTI Configuration Messages for a specific MSTI, then the port stops forwarding data traffic onto that MSTI, consequently pruning that MSTI. This solution has a drawback in that it prevents the "pruned" MSTIs from spanning an entire computer network as required by the MSTP standard. As such, this solution is in effect a non-standard solution. Accordingly, there is a need for a new solution that can be used to provide the best connectivity achievable within a VLAN while addressing the aforementioned drawback of the traditional "pruning MSTI" solution. This need and other needs are satisfied by the method, bridge and computer network of the present invention.

BRIEF DESCRIPTION OF THE INVENTION

The present invention includes a method for configuring a computer network managed by the IEEE Std 802.1s™-2002 MSTP standard or any other equivalent standard such as IEEE Std 802.1Q™-2003 in a fully- or semi-automatic manner such that: (1) if at all possible and in the case of a failure affecting a MSTI, MSTP reestablishes connectivity in that MSTI by preferably activating links whose activation ensures that the connectivity within a VLAN mapped onto and associated with that MSTI is not lost; and (2) a VLAN is mapped onto a MSTI whose active topology (described below) covers the topology of this VLAN, this being ensured by setting up that MSTI depending on the desired VLAN topology. The present invention also includes the computer network and bridges that implement the aforementioned method.

BRIEF DESCRIPTION OF THE DRAWINGS

A more complete understanding of the present invention may be obtained by reference to the following detailed description when taken in conjunction with the accompanying drawings wherein:

FIG. 6 is a block diagram of an exemplary re-convergent scenario when a link between bridges B and C fails in VLAN 1 shown in FIG. 3A;

FIG. 7 is a block diagram of an exemplary re-convergent scenario when two links between bridges B and C and bridges B and D fail in VLAN 1 shown in FIG. 3A;

FIG. 8 is a block diagram of an exemplary VLAN labeled as VLAN 3 that is used to help describe a second feature of the present invention;

FIG. 9 is a block diagram of an exemplary MSTI labeled as MSTI 3 that can be created in accordance with the second feature of the present invention;

FIG. 10 is a block diagram illustrating how VLAN 3 of FIG. 8 can be mapped onto and associated with MSTI 3 of FIG. 9 to help describe the second feature of the present invention;

DETAILED DESCRIPTION OF THE DRAWINGS

Figure 1:
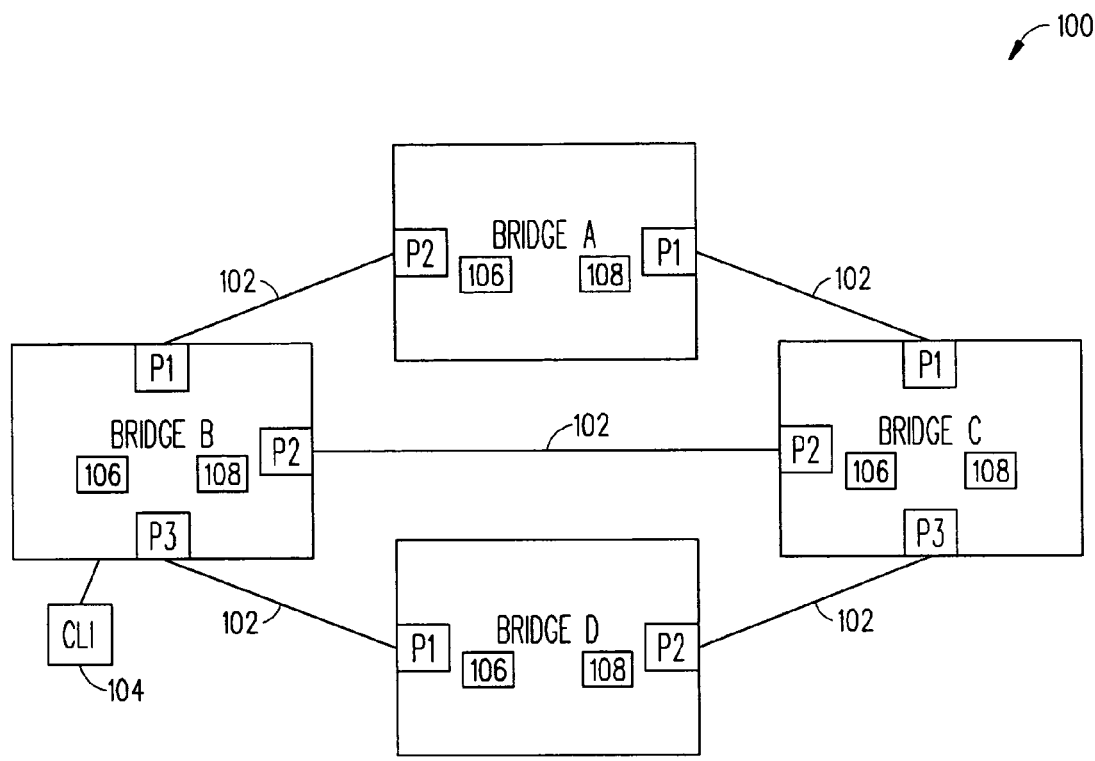
FIG. 1 is a block diagram of an exemplary computer network used to help describe the first feature of the present invention.

Referring to FIG. 1, there is shown a block diagram that illustrates the physical topology of an exemplary computer network 100. The computer network 100 includes bridges A, B, C and D (only four shown) that are interconnected to one another by links 102. Each bridge A, B, C and D includes one or more ports P1, P2 and P3 each of which is connected to a port on another bridge A, B, C or D via one of the links 102. It should be noted that the number of bridges A, B, C and D shown within computer network 100 has been selected for simplicity of illustration and that the number of bridges A, B, C and D and their configuration should not be a limitation on the present invention. Moreover, it should be appreciated that the present invention also covers bridges when they are configured to form one or many MSTP regions.

Figures 2A, 2B:
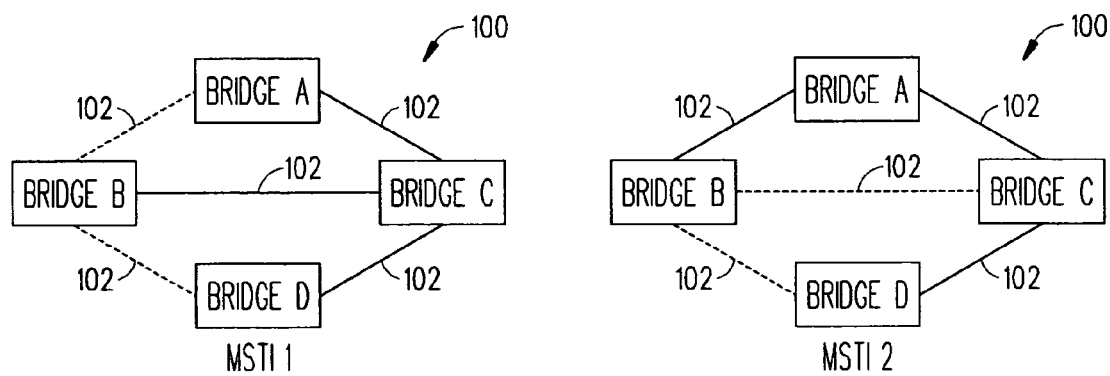
FIG. 2A is a block diagram of an exemplary MSTI labeled as MSTI 1 that is used to help describe the first feature of the present invention.
FIG. 2B is a block diagram of an exemplary MSTI labeled as MSTI 2 that is used to help describe the first feature of the present invention.

As can be seen, the computer network 100 includes a plurality of redundant communication paths. For example, there are at least three different communication paths from bridge B to bridge A including: path #1 from bridge B to bridge A; path #2 from bridge B to bridge C to bridge A; and path #3 from bridge B to bridge D to bridge C to bridge A. The existence of such redundant paths prevents portions of the computer network 100 from becoming isolated should any constituent link 102 or bridge A, B, C or D fail. Such redundancy, however, also results in the creation of loops that are highly undesirable. To avoid the creation of loops, bridge A, B, C and D execute the MSTP to reduce the physical topology of the computer network 100 to an active topology that is both loop-free ('tree') and fully-connected ('spanning'). To accomplish this, the MSTP is used to generate loop-free and fully-connected Multiple Spanning Tree Instances (MSTIs). FIGS. 2A and 2B illustrate two exemplary MSTIs labeled MSTI 1 and MSTI 2 that are configured in a manner that eliminates loops in the computer network 100 while at the same time conserving simple and full connectivity within the computer network 100 between bridges A, B, C and D. The ports attached to the "dashed" links 102 in MSTI 1 and MSTI 2 are not forwarding data traffic. As such, the "dashed" links 102 are not part of the active topology of either MSTI 1 or MSTI 2. The active topology of a MSTI is a topology that is made up of links 102 whose ports that are connected to them are forwarding data traffic. Consequently, the "dashed" links 102 in MSTI 1 and MSTI 2 are not part of the active topology of MSTI 1 or MSTI 2 but might become part of the active topology of MSTI 1 or MSTI 2 if the ports connected to them are commanded by MSTP to start forwarding data traffic, e.g. if there is a failure in the computer network 100 (see FIG. 6).

Figure 3A:
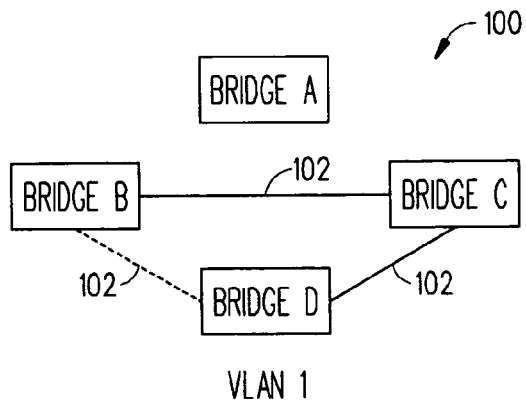
FIG. 3A is a block diagram of an exemplary VLAN labeled as VLAN 1 that is used to help describe the first feature of the present invention.
Figure 3B:
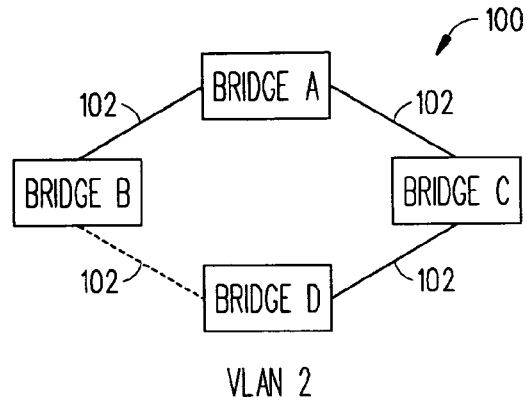
FIG. 3B is a block diagram of an exemplary VLAN labeled as VLAN 2 that is used to help describe the first feature of the present invention.

The computer network 100 and in particular bridges A, B, C and D and their ports can be configured by a network administrator to recognize one or more VLANs. FIGS. 3A and 3B illustrate two exemplary VLANS labeled VLAN 1 and VLAN 2 that can be created within the computer network 100. As can be seen, the data traffic assigned to VLAN 1 should not be forwarded between bridges A and B or between bridges A and C. And, the data traffic assigned to VLAN 2 should not be forwarded directly between bridges B and C. The "dashed" links 102 in VLAN 1 and VLAN 2 indicate an alternative link 102 that can be used in case of the failure of one of the other links 102 in VLAN 1 and VLAN 2.

Figure 4A:
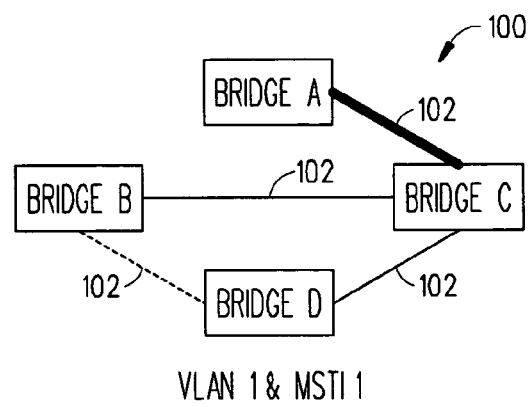
FIG. 4A is a block diagram that illustrates how VLAN 1 of FIG. 3A can be mapped onto and associated with MSTI 1 of FIG. 2A and that is used to help describe the first feature of the present invention.
Figure 4B:
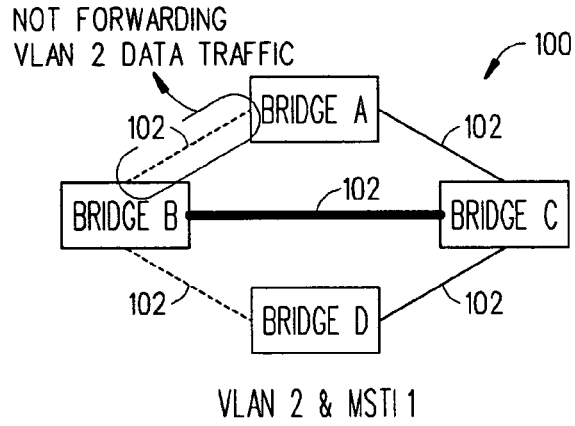
FIG. 4B is a block diagram that illustrates why VLAN 2 of FIG. 3B should not be mapped onto and associated with MSTI 1 of FIG. 2A and that is used to help describe the first feature of the present invention.
Figure 4C:
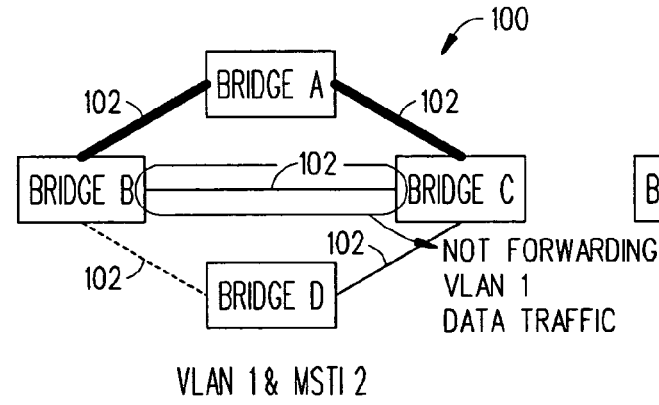
FIG. 4C is a block diagram that illustrates why VLAN 1 of FIG. 3A should not be mapped onto and associated with MSTI 2 of FIG. 2B and that is used to help describe the first feature of the present invention.
Figure 4D:
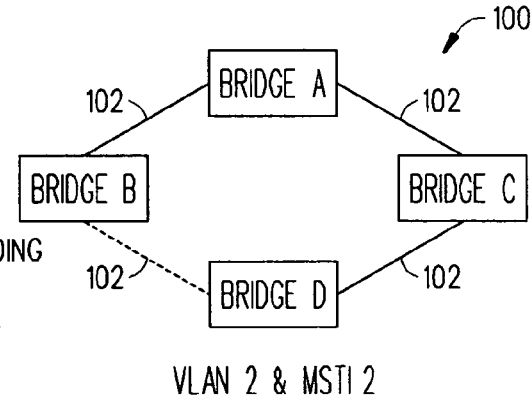
FIG. 4D is a block diagram that illustrates how VLAN 2 of FIG. 3B can be mapped onto and associated with MSTI 2 of FIG. 2B and that is used to help describe the first feature of the present invention.

Referring to FIGS. 4A-4D, there are shown various scenarios that can occur when VLAN 1 and VLAN 2 are mapped onto and associated with MSTI 1 and MSTI 2. As shown in FIG. 4A, VLAN 1 can be properly mapped onto and associated with MSTI 1 since the active topology of MSTI 1 covers the topology of VLAN 1 entirely. However as shown in FIG. 4B, VLAN 2 should not be mapped onto nor associated with MSTI 1 since the active topology of MSTI 1 does not cover the topology of VLAN 2 entirely. In particular, if VLAN 2 was mapped onto and associated with MSTI 1 then data would be dropped between bridges A and B. Likewise as shown in FIG. 4C, VLAN 1 should not be mapped onto nor associated with MSTI 2 since the active topology of MSTI 2 does not cover the topology of VLAN 1 entirely. In particular, if VLAN 1 was mapped onto or associated with MSTI 2 then data would be dropped between bridges B and C. However as shown in FIG. 4D, VLAN 2 can be properly mapped onto and associated with MSTI 2 since the active topology of MSTI 2 covers the topology of VLAN 2 entirely. The "thick" links 102 in FIGS. 4A-4D indicate links 102 that are in the active topologies of MSTI 1 and MSTI 2 but are not in the topologies of VLAN 1 and VLAN 2.

Figure 5A:
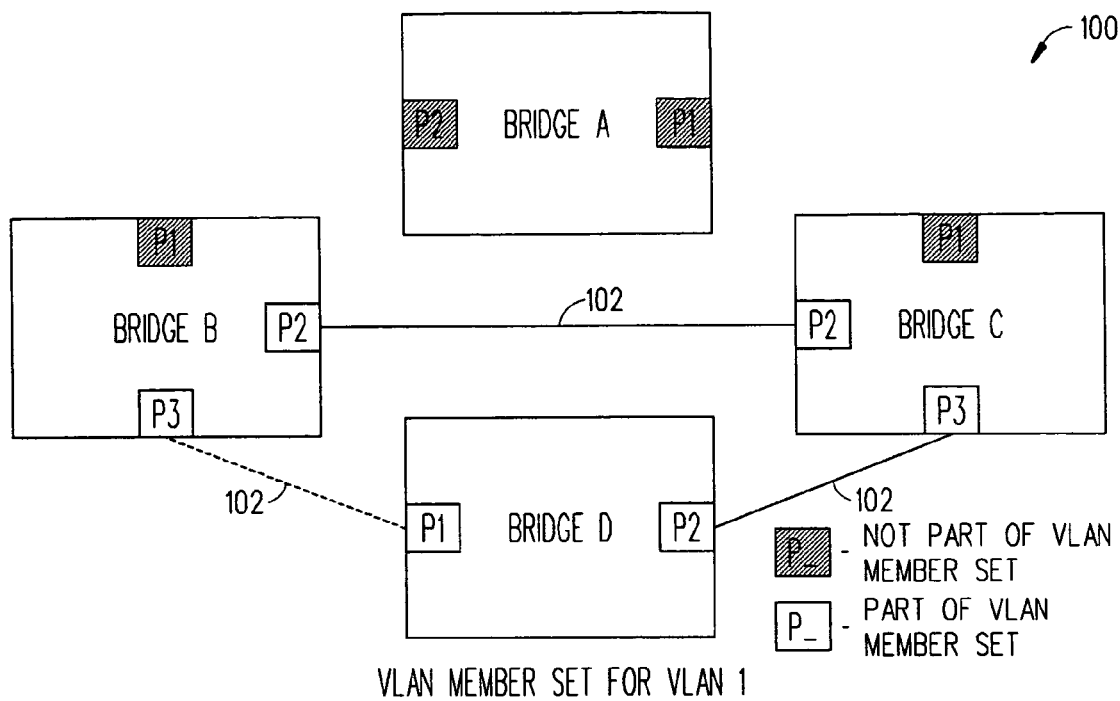
FIG. 5A is a block diagram that illustrates how the Internal Port Path Costs (IPPCs) of ports within bridges A, B, C and D in MSTI 1 onto which VLAN 1 was mapped can be set, in accordance with the first feature of the present invention.

As described above, VLAN 1 should be mapped onto and associated with MSTI 1 and VLAN 2 should be mapped onto and associated with MSTI 2 (see FIGS. 4A and 4D). This association leads to the definition of VLAN member sets on a per-VLAN basis with respect to individual MSTIs. Each VLAN member set includes all ports P1, P2 or P3 in bridges A, B, C or D to which data traffic destined to the members of a specific VLAN should be forwarded. To help describe the VLAN member sets in more detail reference is made to FIGS. 5A and 5B. In FIG. 5A, there is a block diagram illustrating which of the ports P1, P2 or P3 in bridges A, B, C or D are part of the member set for VLAN 1. In particular, the ports P1, P2 or P3 in bridges A, B, C or D can be classified as follows:

Bridge A:
    port 1: not part of the member set for VLAN 1
    port 2: not part of the member set for VLAN 1
Bridge B:
    port 1: not part of the member set for VLAN 1
    port 2: part of the member set for VLAN 1
    port 3: part of the member set for VLAN 1
Bridge C:
    port 1: not part of the member set for VLAN 1
    port 2: part of the member set for VLAN 1
    port 3: part of the member set for VLAN 1
Bridge D:
    port 1: part of the member set for VLAN 1
    port 2: part of the member set for VLAN 1

Figure 5B:
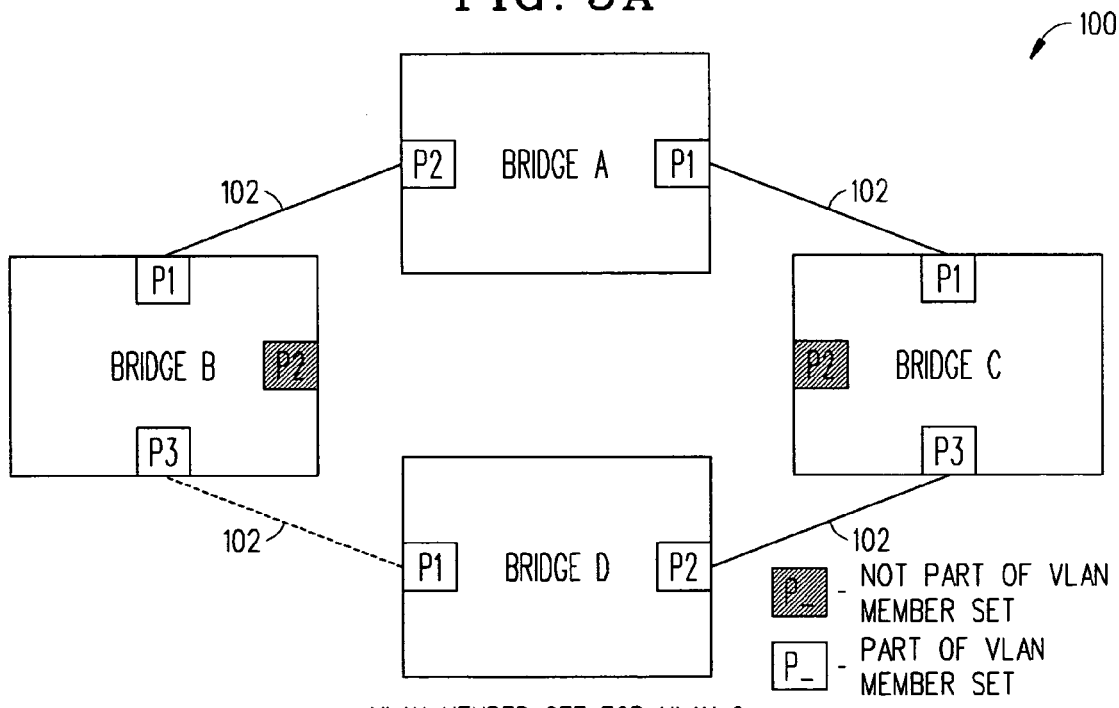
FIG. 5B is a block diagram that illustrates how the IPPCs of ports within bridges A, B, C and D in MSTI 2 onto which VLAN 2 was mapped can be set, in accordance with the first feature of the present invention.

In FIG. 5B, there is a block diagram illustrating which of the ports P1, P2 or P3 in bridges A, B, C or D are part of the member set for VLAN 2. In particular, the ports P1, P2 or P3 in bridges A, B, C or D can be classified as follows:

Bridge A:
    port 1: part of the member set for VLAN 2
    port 2: part of the member set for VLAN 2
Bridge B:
    port 1: part of the member set for VLAN 2
    port 2: not part of the member set for VLAN 2
    port 3: part of the member set for VLAN 2
Bridge C:
    port 1: part of the member set for VLAN 2 port 2: not part of the member set for VLAN 2
port 3: part of the member set for VLAN 2
Bridge D:
port 1: part of the member set for VLAN 2
port 2: part of the member set for VLAN 2

After the VLAN member sets are created and the VLANs are mapped onto and associated with an appropriate MSTI, then the first feature of the present invention is performed. That is, the IPPCs of the "shaded" ports P1, P2 and P3 in bridges A, B, C and D and in the corresponding MSTI that are not part of the VLAN member set are set to a High IPPC (HiIPPC) value chosen in such a way that the corresponding ports are among the last ones to be commanded by MSTP to start forwarding data traffic if needed after a failure in the computer network. For instance, the IPPC of those ports P1, P2 and P3 can be set to a value higher than any of the values used for the IPPCs of ports that are part of the VLAN member set, ideally between the highest value allowed by their encoding and the highest IEEE standard recommended value (e.g., see IEEE Std 802.1s™-2002 or IEEE Std 802.1Q™-2003), regardless of the type of links 102 that are connected to those ports P1, P2 and P3. And, the IPPCs of the ports P1, P2 and P3 in bridges A, B, C and D and in the corresponding MSTI that are part of the VLAN member set are set to a Lower IPPC (LoIPPC) value chosen sufficiently lower than the HiIPPC value in such a way that the corresponding ports are among the first ones to be commanded by MSTP to start forwarding data traffic if needed after failure in the computer network. For instance, the IPPC of those ports P1, P2 and P3 can be set to IEEE standard recommended values based on the link speed of the links 102 that are connected to those ports P1, P2 and P3 (e.g., see IEEE Std 802.1s™-2002 and IEEE Std 802.1Q™-2003). It is likely that the "non-shaded" ports P1, P2 and P3 connected to one another by "dashed" links 102 are set to a higher IPPC value than the "non-shaded" ports P1, P2 and P3 connected to one another by "non-dashed" links 102. The setting of the IPPCs of all the ports P1, P2 and P3 can be fully-automatic or semi-automatic. In the latter case, the network administrator can be assisted and guided to select the values of the IPPCs using for example a Command Line Interface (CLI) 104 (see FIG. 1). A CLI 104 is a device connected to or part of a bridge that allows for human interaction with the bridge. Such interaction can be either direct or indirect, i.e. the human operator can provide input to or receive output from the bridge and have this input/output generated live or retrieved from or dumped to one or more files, e.g. for later review or automatic processing. The CLI 104 can be used to operate one or many bridges. It should be appreciated that only one CLI 104 appears on FIG. 1 although more than one may be used on one or many bridges.

The application of the first feature of the present invention results in the MSTP reestablishing connectivity in a MSTI experiencing a failure by preferably activating links 102 whose activation ensures that the connectivity within a VLAN mapped onto and associated with that MSTI is not lost. In addition, this technique takes into account all physical links 102 as required by IEEE Std 802.1s™-2002 or any other equivalent standard such as IEEE Std 802.1Q™-2003 and makes sure that links 102 not used by a VLAN are so expensive that they are only used as a last resort which usually means that the desired VLAN topology can no longer be achieved, as more thoroughly explained next.

After applying the first feature of the present invention, if there are one or more failures of links 102 in a VLAN then the failed link(s) 102 may be bypassed by the activation of other available "dashed" link(s) 102 in that VLAN. FIG. 6 shows a scenario where the connectivity within VLAN 1 is maintained when the link 102 between bridges B and C fails and then the link 102 between bridges B and D is activated. FIG. 7 shows another scenario where the connectivity within VLAN 1 is not maintained when two link 102 failures in that VLAN 1 cause MSTP to reestablish connectivity in MSTI 1 by activating two high-cost "thick" links 102 outside VLAN 1. In this scenario, the connectivity within VLAN 1 is lost although this is expected behavior, as VLAN 1 does not span the entire physical topology.

Reference is now made to FIGS. 8-11 that are used to help describe the second feature of the present invention. The second feature is to be generally used in the situation when, after trying to map a VLAN onto the active topologies of all existing MSTIs, the active topology of any MSTI does not cover that VLAN entirely, i.e. when there is no match between that VLAN and any MSTI. In such a situation and in accordance with the second feature of the present invention, a centralized network management system (for example based on the Simple Network Management Protocol—SNMP) can be used to create and configure in a fully-automatic fashion, a new MSTI that matches a previously un-matched VLAN by configuring all of the bridges participating in the physical topology, based on existing information. Alternatively, in the absence of a centralized management, a semi-automatic process can be used to implement the second feature of the present invention where the network administrator is assisted and guided in the creation and configuration of a new MSTI using for example the CLI 104. After there is a new MSTI, the values of the IPPCs of the ports P1, P2 and P3 in the bridges are chosen to avoid dropping the data traffic of a VLAN as described above with respect to the first feature of the present invention. It should be appreciated that the second feature of the present invention can be used in any situation to create and configure MSTIs in addition to being used to create and configure MSTIs when a VLAN does not match existing MSTIs.

Figure 11:
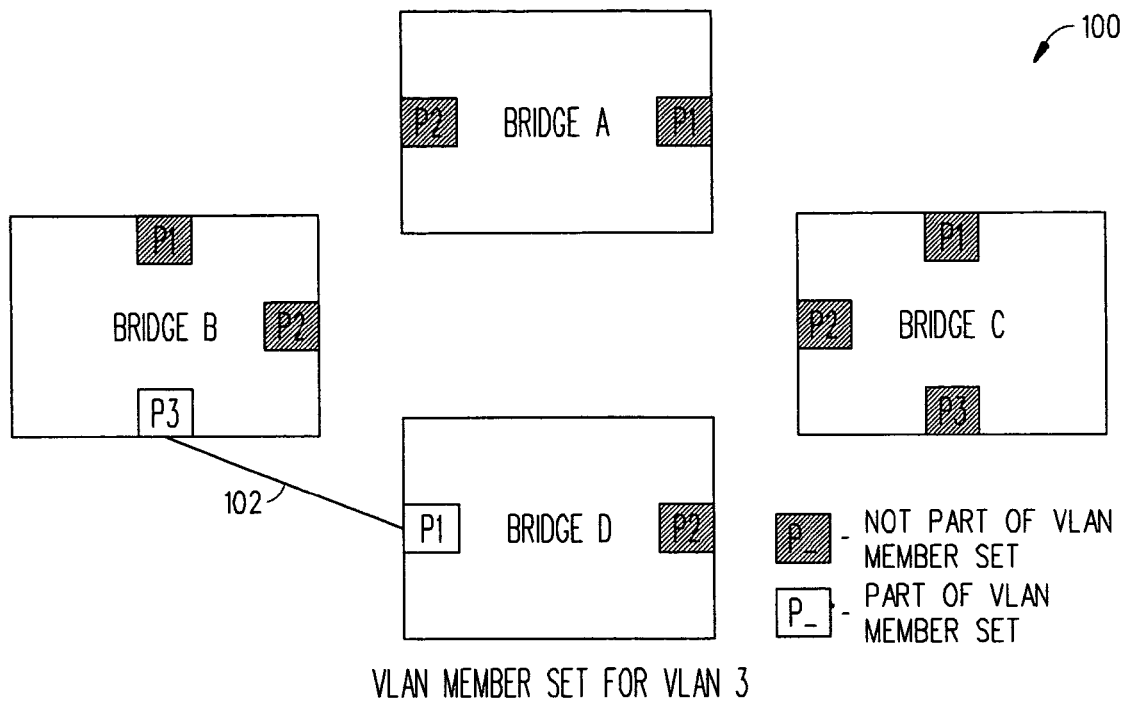
FIG. 11 is a block diagram illustrating how the IPPCs of ports within bridges A, B, C and D in MSTI 3 onto which VLAN 3 was mapped can be set in accordance with the first feature of the present invention.

To better describe the second feature of the present invention, reference is made to FIG. 8 that illustrates an exemplary VLAN labeled as VLAN 3 that could be created and configured by a network administrator in computer network 100 leading to the creation of an appropriate VLAN member set. This VLAN member set includes all ports P1, P2 or P3 in bridges A, B, C or D to which data traffic destined to the members of VLAN 3 should be forwarded. Referring again to FIGS. 2A and 2B, it can be readily seen that VLAN 3 should not be mapped onto and associated with the active topologies of either MSTI 1 or MSTI 2 because the data traffic of VLAN 3 between bridge B and D would be dropped. It is at this point that the second feature of the present invention could be activated to create and configure a suitable MSTI either semi- or fully-automatically. FIG. 9 illustrates one exemplary MSTI labeled as MSTI 3 that can be created whose active topology covers the topology of VLAN 3 entirely. As such, VLAN 3 should be mapped onto and associated with MSTI 3. However it should be noted that VLAN 1 and VLAN 2 should not be mapped onto nor associated with MSTI 3. To help describe this VLAN member set in more detail reference is made to FIG. 11. In FIG. 11, there is a block diagram illustrating which of the ports P1, P2 or P3 in bridges A, B, C or D are part of the member set for VLAN 3. In particular, the ports P1, P2 or P3 in bridges A, B, C or D can be classified as follows:
Bridge A:
port 1: not part of the member set for VLAN 3
port 2: not part of the member set for VLAN 3
Bridge B:
port 1: not part of the VLAN member set for VLAN 3
port 2: not part of the member set for VLAN 3 port 3: part of the member set for VLAN 3
Bridge C:
    port 1: not part of the member set for VLAN 3
    port 2: not part of the member set for VLAN 3
    port 3: not part of the member set for VLAN 3
Bridge D:
    port 1: part of the member set for VLAN 3
    port 2: not part of the member set for VLAN 3

After the VLAN member set is created and the VLANs are mapped onto and associated with an appropriate MSTI, the first feature of the present invention is performed. That is, the IPPCs of the "shaded" ports P1, P2 and P3 in bridges A, B, C and D and in MSTI 3 that are not part of the VLAN member set are set to a HiIPPC value. And, the IPPCs of the "non-shaded" ports P1, P2 and P3 in bridges A, B, C and D and in MSTI 3 that are part of the VLAN member set are set to a LoIPPC value. The setting of the IPPCs of all the ports P1, P2 and P3 can be fully-automatic or semi-automatic. In the latter case, the network administrator can be assisted and guided to select the values of the IPPCs using for example the CLI 104.

Again, the application of the first feature of the present invention results in MSTP reestablishing connectivity in a MSTI experiencing a failure by preferably activating links 102 whose activation ensures that the connectivity within a VLAN mapped onto and associated with that MSTI is not lost. In addition, this technique takes into account all physical links 102 as required by the IEEE Std 802.1s™-2002 or any other equivalent standard such as IEEE Std 802.1Q™-2003 and makes sure that links 102 not used by VLAN 3 are so expensive that they are only used as a last resort which usually means that the desired VLAN topology can no longer be achieved.

Figure 12:
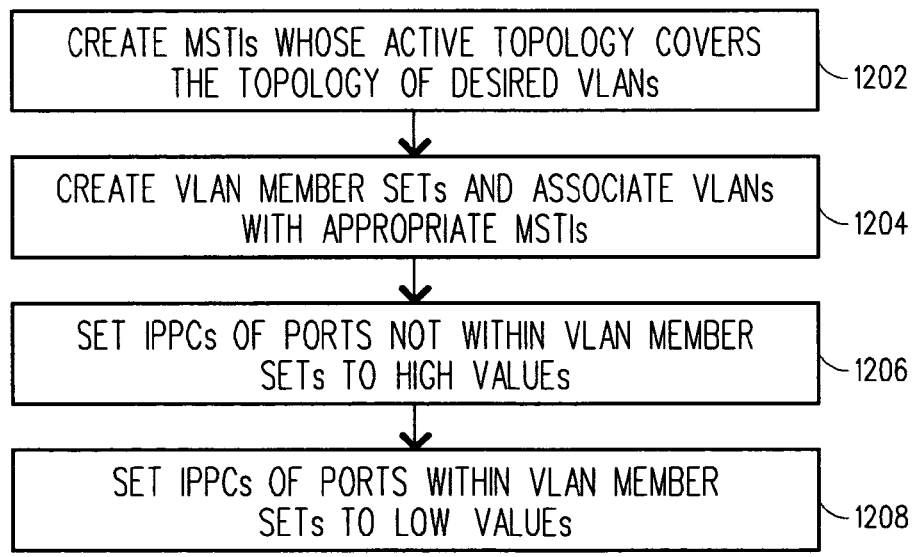
FIG. 12 is a flowchart of the basic steps of a preferred method in accordance with the two features of the present invention.

Referring to FIG. 12, there is shown a flowchart of the basic steps of a preferred method 1200 for obtaining the best connectivity achievable within VLANs when these VLANs are mapped onto a computer network 100 managed by the MSTP in accordance with the two features of the present invention. Beginning at step 1202, the MSTP engines 106 within bridges A, B, C and D are used to create and configure MSTIs (see FIGS. 2A and 2B). The active topology of those MSTIs can be obtained by letting MSTP configure as many MSTIs as necessary or by having the network administrator influence the creation and configuration of as many appropriate MSTIs as necessary. In the former case, the active topology of the created MSTIs might or might not cover the topology of the VLANs that are planned to be used by the network administrator. In the latter case, the network administrator can at step 1202 or at any point in method 1200 and in accordance with the second feature of the present invention create and configure MSTIs (see FIG. 9) whose active topology covers the topology of the VLANs that are planned to be used (see FIGS. 3A and 3B). At step 1204, the processing units 108 in bridges A, B, C and D are used to create VLAN member sets for each VLAN and to both map onto and associate each VLAN with the appropriate MSTI (see FIGS. 5A, 5B). At step 1206 and in accordance with the first feature of the present invention, the processing units 108 in bridges A, B, C and D are used to set the IPPC of any port P1, P2 and P3 of any bridge A, B, C and D within one MSTI to a HiIPPC value if that port is not part of the VLAN member set (see shaded ports in FIGS. 5A and 5B). Lastly at step 1208 and in accordance with the first feature of the present invention, the processing units 108 in bridges A, B, C and D are used to set the IPPC of any port P1, P2 and P3 of any bridge A, B, C and D within one MSTI to a LoIPPC value if that port is part of the VLAN member set (see non-shaded ports in FIGS. 5A and 5B). The computer network 100 can then be operated while the first feature of the present invention helps to maintain the best connectivity within the VLAN.

From the foregoing, it can be readily appreciated by those skilled in the art that the present invention provides a method for fully- or semi-automatically configuring IPPCs of ports in the bridges of a computer network and in fully- or semi-automatically creating as many new MSTIs as necessary to ensure proper VLAN connectivity. In addition, the method does not "prune" any MSTI like in the prior art, which maintains compliancy with IEEE Std 802.1s™-2002 or any other equivalent standard such as IEEE Std 802.1Q™-2003.

It should be understood that the present invention as described above works optimally when only one VLAN is mapped onto one MSTI or, pending modification of its textual content, when more than one VLAN but VLANs with a common topology (i.e. their topologies have all their links 102 in common) are mapped onto one MSTI. However, it should be understood that the present invention can be extended to accommodate the case where more than one VLAN are mapped onto one MSTI and those VLANs do not share a common topology (i.e. their topologies have zero or more but not all of their links 102 in common). In this case, the solution might not be as optimal as in the previous case, i.e. the best connectivity might not be achieved all the time. This is in part due to the fact that IPPCs are defined on a per-port basis but not both on a per-port and per-VLAN basis in a MSTI. When more than one VLAN are mapped onto one MSTI and those VLANs do not share a common topology, the IPPCs of the ports that do not belong to any VLAN member set should be set to a HiIPPC value V1. Then, ports that belong to one or many VLAN member sets but not to some other VLAN member sets should be set to high values lower than V1. The choice of those high values would be at the discretion of the network administrator so as to favor those VLANs whose connectivity integrity matters most. Ideally, the IPPCs of the ports connected to links 102 common to all VLANs might be set to a LoIPPC value, lower than the high values. The second feature of the invention could be customized so as to provide the network administrator with what-if scenarios showing the consequences in terms of connectivity of setting the IPPCs of ports within a MSTI to chosen values. The second feature of the present invention could also integrate algorithms (e.g. computing many of these what-if scenarios automatically) whose goal would be to provide the network administrator with one or many sets of IPPCs. Each set would contain enough information to allow for fully- or semi-automatically setting the IPPC of each port in a MSTI so as to ensure that the highest connectivity is achieved within each of the VLANs mapped onto that MSTI.

In the above description, the IPPC of a port is defined on a per-MSTI basis. It should be understood that the Central and Internal Spanning Tree (CIST) defined as part of MSTP includes one or many internal parts, each of which when taken individually within a MSTP region is an MSTI, MSTI number zero. As such, the IPPCs of the ports within this MSTI number zero can also be set as described in the first feature of the present invention. It should also be understood that the setting of the IPPCs as described in the first feature of the present invention could be extended to accommodate not only a MSTI but any equivalent single spanning tree. A MSTI is a single spanning tree that, when taken together with other MSTIs that are also single spanning trees, forms a set of single spanning trees often referred to as a multiple spanning tree. Algorithms and protocols like the Spanning Tree algorithm and Protocol (STP) defined in IEEE Std 802.1D™-1998 and the Rapid Spanning Tree algorithm and Protocol (RSTP)

defined in IEEE Std 802.1w™-2001 can also be used to create, configure and maintain one or many single spanning trees. Those algorithms and protocols like the MSTP all rely on the spanning tree algorithm invented by Radia Perlman and described in her book entitled "Interconnections Second Edition Bridges, Routers, Switches, and Internetworking Protocols" by Addison-Wesley Publishing Company, Inc., the contents of which are incorporated herein. The latter algorithm is used to generate single spanning trees. When applying the setting of IPPCs as described above as part of the first feature of the present invention to any one of these single spanning trees, the IPPCs should be referred to as Port Path Costs (PPCs). It should also be understood that one or many of these single spanning trees could be operated using any of the aforementioned algorithms and protocols (e.g. STP or RSTP) within any computer network 100 and that one or many VLANs could be mapped onto and associated with any one of them.

Following is a list of some of the other features and advantages associated with the present invention:

The present invention is an improvement over the traditional method of "pruning MSTIs" that might adversely affect the proper working of the MSTP.

The present invention is very user-friendly because the ports whose IPPCs need to be set to a high value are automatically detected and the value chosen for those IPPCs is appropriately chosen in a semi- or fully-automatic manner.

The present invention can enable the creation or provide guidance in the creation of new MSTIs. This step that is the second feature of the present invention may be optional if proper MSTIs exist.

The present invention maintains the entire operation of a MSTP-based Bridged LAN. As such it remains perfectly interoperable with existing MSTP-based equipment and does not require standardization.

The present invention includes a method for configuring MSTP in such a way that:

If at all possible and in the case of a failure affecting a MSTI, MSTP reestablishes connectivity in that MSTI by preferably activating links whose activation ensures that the connectivity within a VLAN mapped onto and associated with that MSTI is not lost (first feature of present invention).

A VLAN is mapped onto a MSTI whose active topology covers the topology of this VLAN, this being ensured by setting up that MSTI depending on the desired VLAN topology Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A method for forwarding data frames between bridges within a computer network, the bridges including ports; said method comprising the steps of:
    creating and configuring a plurality of Multiple Spanning Tree Instances (MSTIs) whose active topology covers the topology of Virtual Local Area Networks (VLANs) being used within the computer network;
    creating VLAN member sets and associating each of said VLANs with an appropriate one of the MSTIs, each of said VLAN member sets indicating the ports in each of the bridges within one of the MSTIs to which data traffic destined to members of the associated VLAN is being forwarded;
    setting the Internal Port Path Cost (IPPC) of one of the ports of one of said bridges within the MSTI to a high IPPC when said port is not part of the VLAN member set; and
    setting the IPPC of one of the ports of one of said bridges within the MSTI to a lower IPPC when said port is part of the VLAN member set;
    said settings reestablish connectivity in one of the MSTIs experiencing a failure by activating links whose activation ensures that the connectivity within the VLAN mapped onto and associated with the MSTI is not lost;
    wherein said high IPPC is a value that is higher than any of the values used for the IPPCs of ports that are part of the VLAN member set; and said lower IPPC is a value that is based on a speed of the links that are connected to the corresponding ports that are part of the VLAN member set.

2. The method of claim 1, wherein said MSTI and VLAN member set creating steps and said setting steps are repeated for each of the MSTIs.

3. The method of claim 1, wherein each MSTI is created and configured using a Multiple Spanning Tree Protocol (MSTP) engine.

4. The method of claim 1, wherein each bridge operates at layer 2 of the Open Systems Interconnection reference model.

5. The method of claim 1, wherein said setting steps are performed in a fully-automatic manner or a semi-automatic manner.

6. The method of claim 1, wherein:
    said high IPPC is set to a value chosen sufficiently high in such a way that the corresponding ports are among the last ones commanded by a Multiple Spanning Tree Protocol (MSTP) to start forwarding data traffic after a failure in the computer network; and
    said lower IPPC is set to a value chosen sufficiently lower than the high IPPC value in such a way that the corresponding ports are among the first ones commanded by the MSTP to start forwarding data traffic after the failure in the computer network.

7. The method of claim 6, wherein:
    said high IPPC is a value that is ideally between the highest value allowed by an encoding and the highest IEEE standard recommended value, regardless of the type of links that are connected to the corresponding ports that are not part of the VLAN member set; and
    said lower IPPC is a value that is an IEEE standard recommended value.

8. A bridge having a plurality of ports connected by links to other ports and bridges in a computer network that is segregated into a plurality of Virtual Local Area Networks (VLANs), said bridge comprising:
    a Multiple Spanning Tree Protocol (MSTP) engine used for creating and configuring a plurality of Multiple Spanning Tree Instances (MSTIs) whose active topology covers the topology of the plurality of VLANs within the computer network;
    a processing unit for creating VLAN member sets and associating each of said VLANs with an appropriate one of the MSTIs, each of said VLAN member sets indicating the ports in each of the bridges within one of the MSTIs to which data traffic destined to members of the associated VLAN is being forwarded;

said processing unit for setting the Internal Port Path Cost (IPPC) of one of the ports of one of said bridges within the MSTI to a high IPPC when said port is not part of the VLAN member set; and said processing unit for setting the IPPC of one of the ports of one of said bridges within the MSTI to a lower IPPC when said port is part of the VLAN member set;

said settings reestablish connectivity if the MSTI experiences a failure by activating links whose activation ensures that the connectivity within the VLAN mapped onto and associated with the MSTI is not lost;

wherein said high IPPC is a value that is higher than any of the values used for the IPPCs of ports that are part of the VLAN member set; and said lower IPPC is a value that is based on a speed of the links that are connected to the corresponding ports that are part of the VLAN member set.

9. The bridge of claim 8, wherein said bridge operates at layer 2 of the Open Systems Interconnection reference model.

10. The bridge of claim 8, wherein:

said high IPPC is set to a value chosen sufficiently high in such a way that the corresponding ports are among the last ones commanded by a Multiple Spanning Tree Protocol (MSTP) to start forwarding data traffic after a failure in the computer network; and said lower IPPC is set to a value chosen sufficiently lower than the high IPPC value in such a way that the corresponding ports are among the first ones commanded by the MSTP to start forwarding data traffic after the failure in the computer network.

11. The bridge of claim 10, wherein:

said high IPPC is a value that is ideally between the highest value allowed by an encoding and the highest IEEE standard recommended value, regardless of the type of links that are connected to the corresponding ports that are not part of the VLAN member set; and said lower IPPC is a value that is an IEEE standard recommended value.

12. The bridge of claim 8, wherein a network administrator using a command line interface is capable of creating, maintaining, or suppressing any of the plurality of MSTIs as well as one or more VLANs and their association to an appropriate MSTI of the plurality of MSTIs.

13. A computer network comprising:

a bridge having a plurality of ports connected by links to other ports and bridges, wherein said computer network is capable of forwarding data frames between bridges by:

creating and configuring a plurality of Multiple Spanning Tree Instances (MSTIs) whose active topology covers the topology of Virtual Local Area Networks (VLANs) being used within the computer network;

creating VLAN member sets and associating each of said VLANs with an appropriate one of the MSTIs, each of said VLAN member sets indicating the ports in each of the bridges within one of the MSTIs to which data traffic destined to members of the associated VLAN is being forwarded;

setting the Internal Port Path Cost (IPPC) of one of the ports of one of said bridges within the MSTI to a high IPPC when said port is not part of the VLAN member set; and setting the IPPC of one of the ports of one of said bridges within the MSTI to a lower IPPC when said port is part of a the VLAN member set;

said settings reestablish connectivity in one of the MSTIs experiencing a failure by activating links whose activation ensures that the connectivity within the VLAN mapped onto and associated with the MSTI is not lost;

wherein said high IPPC is a value that is higher than any of the values used for the IPPCs of ports that are part of the VLAN member set; and said lower IPPC is a value that is based on a speed of the links that are connected to the corresponding ports that are part of the VLAN member set.

14. The computer network of claim 13, wherein each MSTI is created and configured using a Multiple Spanning Tree Protocol (MSTP) engine.

15. The computer network of claim 13, wherein said MSTI and VLAN member set creating steps and said setting steps are repeated for each of the MSTIs.

16. The computer network of claim 13, wherein each bridge operates at layer 2 of the Open Systems Interconnection reference model.

17. The computer network of claim 13, wherein:

said high IPPC is set to a value chosen sufficiently high in such a way that the corresponding ports are among the last ones commanded by a Multiple Spanning Tree Protocol (MSTP) to start forwarding data traffic after a failure in the computer network; and said lower IPPC is set to a value chosen sufficiently lower than the high IPPC value in such a way that the corresponding ports are among the first ones commanded by the MSTP to start forwarding data traffic after the failure in the computer network.

18. The computer network of claim 17, wherein:

said high IPPC is a value that is ideally between the highest value allowed by an encoding and the highest IEEE standard recommended value, regardless of the type of links that are connected to the corresponding ports that are not part of the VLAN member set; and said lower IPPC is a value that is an IEEE standard recommended value.

* * * * *